United States Patent
Yang

(10) Patent No.: US 9,182,599 B2
(45) Date of Patent: Nov. 10, 2015

(54) HEAD MOUNTED DISPLAY

(71) Applicant: Quanta Computer Inc., Tao Yuan Shien (TW)

(72) Inventor: Wen-Chu Yang, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 0 days.

(21) Appl. No.: 14/296,562

(22) Filed: Jun. 5, 2014

(65) Prior Publication Data

US 2015/0268470 A1    Sep. 24, 2015

(30) Foreign Application Priority Data

Mar. 21, 2014   (TW) .............................. 103110647 A

(51) Int. Cl.
  *G09G 5/00*    (2006.01)
  *G02B 27/01*   (2006.01)

(52) U.S. Cl.
  CPC .................................. *G02B 27/017* (2013.01)

(58) Field of Classification Search
  CPC ............ G02B 21/017; G02B 2027/0118; G02B 2027/0138; G02B 2027/014; G02B 2027/0112; G02B 27/0172; G02B 2027/0152; G02B 2027/0156; G02B 2027/0178
  USPC .......................................... 345/7, 8, 156–184
  See application file for complete search history.

(56) References Cited

U.S. PATENT DOCUMENTS

| | | | |
|---|---|---|---|
| 2002/0171605 A1* | 11/2002 | Kim et al. .......................... 345/8 |
| 2009/0037477 A1* | 2/2009 | Choi et al. .................. 707/104.1 |
| 2012/0200595 A1* | 8/2012 | Lewis et al. .................... 345/619 |
| 2012/0321059 A1* | 12/2012 | O'Connor et al. ......... 379/93.21 |
| 2013/0222334 A1* | 8/2013 | Tokutake ....................... 345/174 |
| 2014/0071539 A1* | 3/2014 | Gao ............................. 359/630 |
| 2015/0088625 A1* | 3/2015 | Eronen et al. ............... 705/14.16 |

FOREIGN PATENT DOCUMENTS

TW           201346333 A         11/2013

OTHER PUBLICATIONS

Taiwanese Office Action dated May 25, 2015.

* cited by examiner

*Primary Examiner* — Abbas Abdulselam
*Assistant Examiner* — Gerald Oliver
(74) *Attorney, Agent, or Firm* — Rabin & Berdo, P.C.

(57) ABSTRACT

A head mounted display (HMD) is disclosed. The HMD comprises a screen, a processing circuit and an eyeglass frame. The screen displays a coded data associated with an exchange information. The processing circuit outputs the coded data to the screen. The eyeglass frame carries the screen and the processing circuit.

20 Claims, 8 Drawing Sheets

HEAD MOUNTED DISPLAY

This application claims the benefit of Taiwan application Serial No. 103110647, filed Mar. 21, 2014, the subject matter of which is incorporated herein by reference.

BACKGROUND OF THE INVENTION

1. Field of the Invention

The invention relates in general to an electronic apparatus and more particularly to a head mounted display (HMD).

2. Description of the Related Art

Along with the advance in technology, people assimilate more and more information every day. Commonly seen electronic apparatuses such as multimedia play apparatus, network communication apparatus and computer apparatus are equipped with a cathode ray tube (CRT) or a liquid crystal display (LCD) for displaying images. However, the pixels and size of a displayed image depend on the size and efficiency of the display and a conventional CRT or LCD cannot meet the requirements of large size and convenient portability at the same time. To resolve the above problem, an optical see-through head mounted display (HMD) is provided. The head mounted display apparatus has a CRT or LCD disposed in front of each eye. The head mounted display apparatus projects the images outputted by respective CRT or LCD onto the user's retinas through beam splitters and creates a 3D effect by using the parallax between the user's two eyes.

SUMMARY OF THE INVENTION

The invention is directed to a head mounted display (HMD).

According to one embodiment of the present invention, a head mounted display (HMD) is disclosed. The HMD comprises a screen, a processing circuit and an eyeglass frame. The screen displays a coded data associated with an exchange information. The processing circuit outputs the coded data to the screen. The eyeglass frame carries the screen and the processing circuit.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
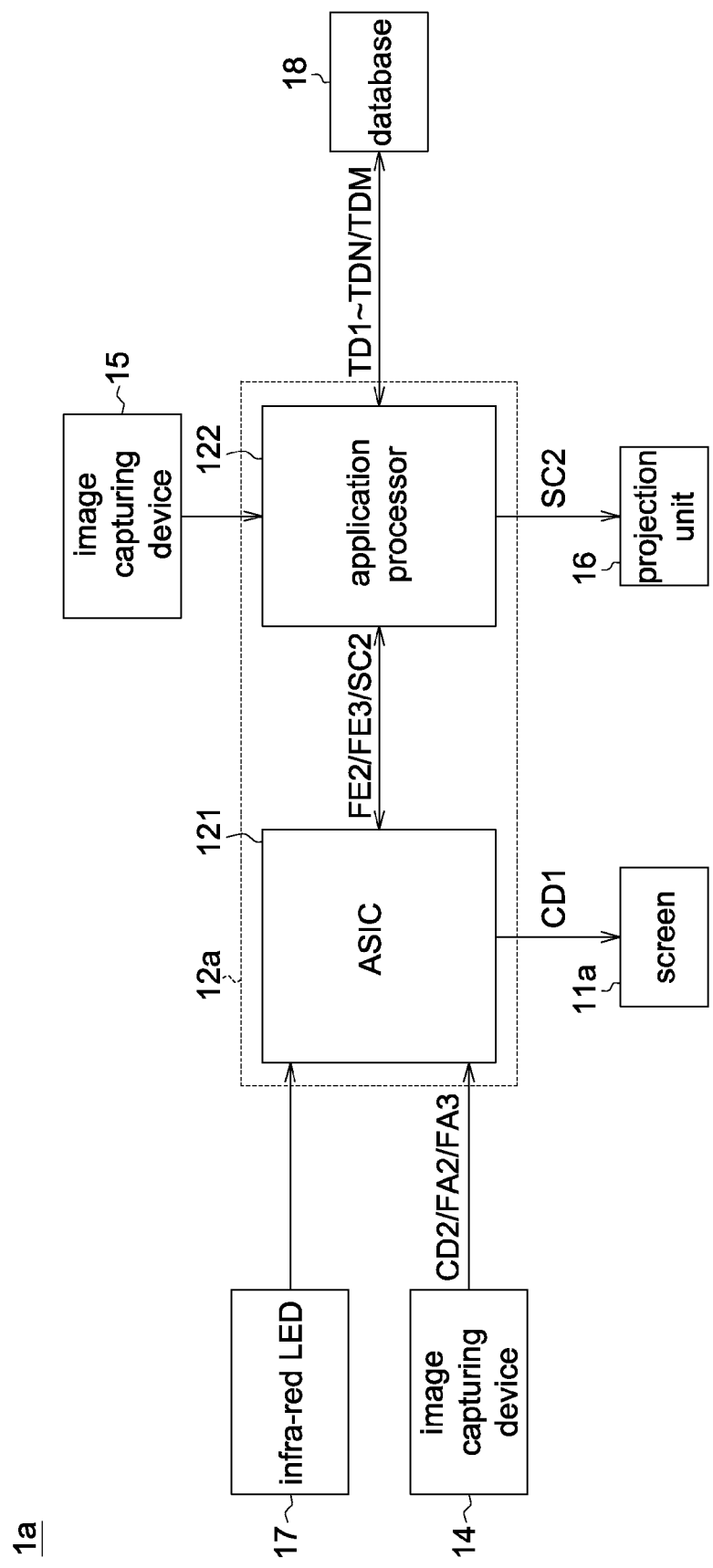
FIG. 1 is a configuration diagram of a head-mounted display according to a first embodiment.
Figure 2:
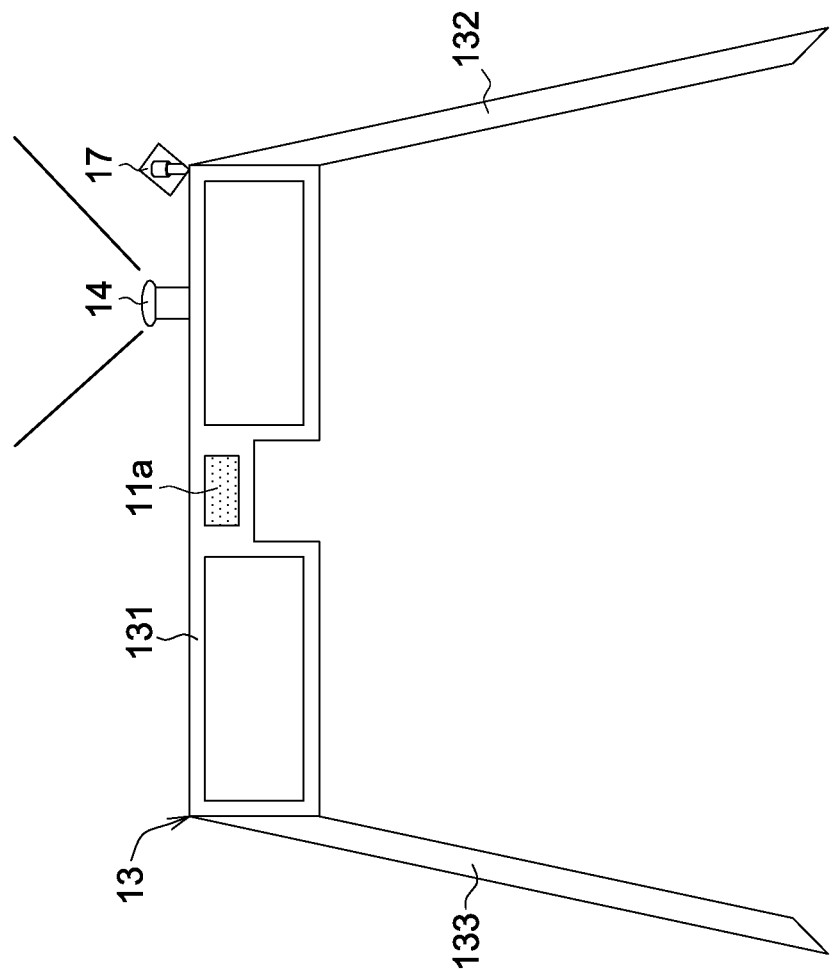
FIG. 2 is an appearance diagram of a head-mounted display according to a first embodiment.

Refer to FIG. 1 and FIG. 2. FIG. 1 is a configuration diagram of a head-mounted display according to a first embodiment. FIG. 2 is an appearance diagram of a head-mounted display according to a first embodiment. The HMD 1a comprises a screen 11a, a processing circuit 12a, an eyeglass frame 13, an image capturing device 14, an image capturing device 15, a projection unit 16, an infra-red LED 17 and a database 18. The eyeglass frame 13 carries the screen 11a, the processing circuit 12a, the image capturing device 14, the image capturing device 15, the projection unit 16, the infra-red LED 17 and the database 18. The eyeglass frame 13 comprises a frame 131 and handles 132 and 133. The frame 131 is located between the handles 132 and 133, and the screen 11a is disposed at the center of the frame 131.

The screen 11a displays a coded data CD1 associated with the user's exchange information. Based on the different natures of social occasions, the user may decide which the exchange information to open. The exchange information is such as the user's hobbies, blog website, Facebook account, e-mail address, occupation, sharing of gourmet and travel experiences, research topics and thesis. The coded data CD1 can be realized by a two-dimensional matrix barcode such as a QR code, a micro QR code, a data matrix or an Aztec code.

The processing circuit 12a outputs the coded data CD1 to the screen 11a. The image capturing device 14 captures a coded data CD2 displayed on the screen of someone's HMD and the facial image FA2 associated with the coded data CD2. The coded data CD2 can be realized by a two-dimensional matrix barcode such as a QR code, a micro QR code, a data matrix or an Aztec code. When the ambient light is not sufficient, the processing circuit 12a can activate the infra-red LED 17 to provide an auxiliary light source to the image capturing device 14. The database 18 stores sample data TD1~TDN. The processing circuit 12a generates someone's exchange information SC2 according to the coded data CD2 and generates the sample data TD2 according to the exchange information SC2. The projection unit 16 projects someone's exchange information SC2 to the user's eyes.

Furthermore, the processing circuit 12a comprises an application specific integrated circuit (ASIC) 121 and an application processor 122. The ASIC 121 is connected to the application processor 122 and communicates with the application processor 122 through a universal serial bus (USB). The ASIC 121 is connected to the infra-red LED 17 and communicates with the infra-red LED 17 through a general purpose input output (GPIO). The ASIC 121 is connected to the image capturing device 14 and communicates with the image capturing device 14 through a mobile industry processor interface (MIPI) or a parallel I/F. The ASIC 121 is connected to the screen 11a and communicates with the screen 11a through the display I/F. The application processor 122 is connected to the image capturing device 15 and communicates with the image capturing device 15 through the mobile industry processor interface (MIPI). The image capturing device 15 can be realized by such as a video camera. The application processor 122 is connected to the projection unit 16 and communicates with the projection unit 16 through the display I/F. The eyeglass frame 13 comprises a frame 131 and handles 132 and 133. The frame 131 is located between the handles 132 and 133 and the screen 11a is disposed at the center of the frame 131.

Figure 3:
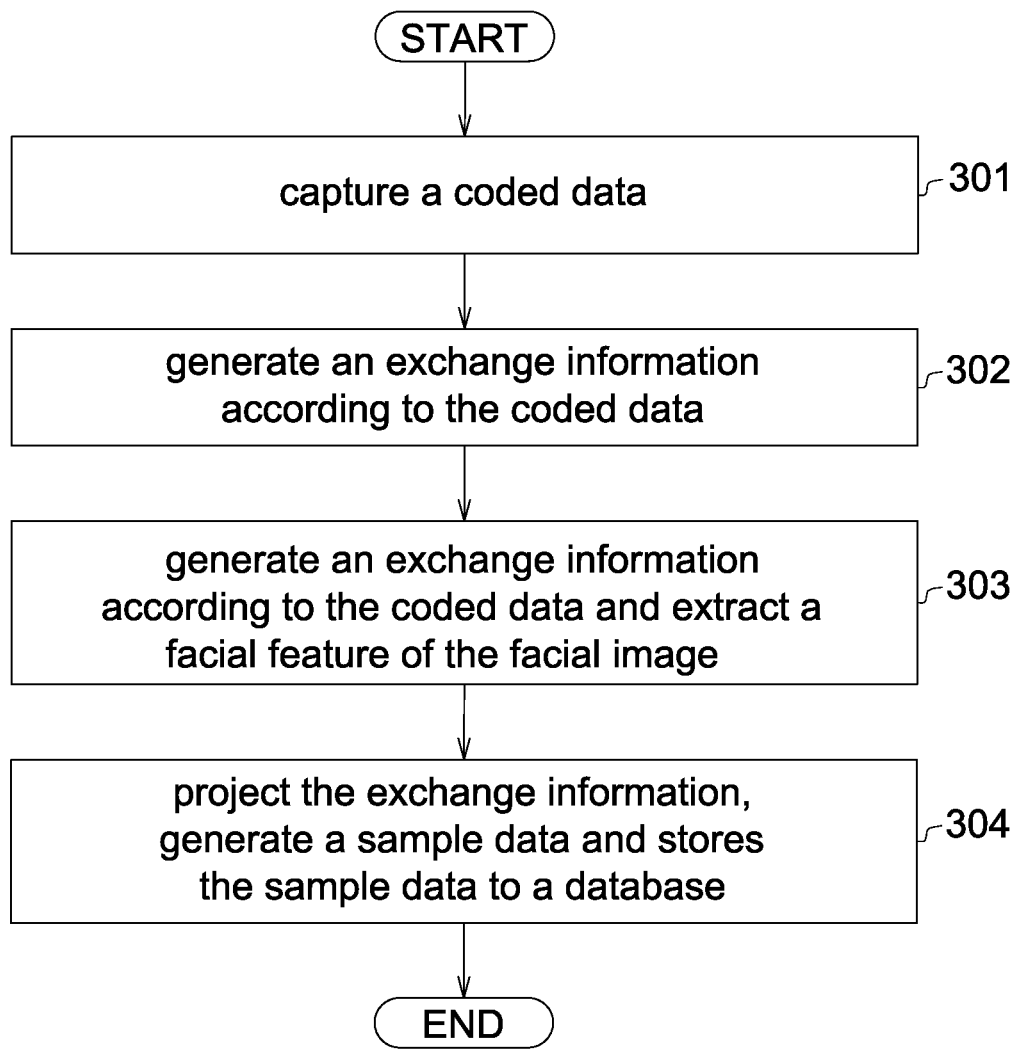
FIG. 3 is a flowchart of generating a sample data according to the coded data.

Refer to FIG. 1 and FIG. 3. FIG. 3 is a flowchart of generating a sample data according to the coded data. Firstly, the method begins at step 301, the image capturing device 14 captures a coded data CD2 displayed on the screen of someone's HMD. When the coded data CD2 is a QR code, the position detection pattern of the QR code will help the processing circuit 12*a* to identify a facial image in subsequent processing. Next, the method proceeds to step 302, the processing circuit 12*a* generates someone's exchange information SC2 according to the coded data CD2 and the image capturing device 14 captures a facial image FA2 associated with the coded data CD2.

Then, the method proceeds to step 303, the processing circuit 12*a* generates someone's exchange information SC2 according to the coded data CD2 and extracts a facial feature FE2 of the facial image FA2. The facial image FA2 corresponds to the exchange information SC2. Then, the method proceeds to step 304, the projection unit 16 projects the exchange information SC2 to the user's eyes and the processing circuit 12*a* generates a sample data TD2 and further stores the sample data TD2 to the database 18. The sample data TD1 and the sample data TD3~TDN can also be generated through the above procedures. The sample data TD1~TDN can have different implementations. For example, the processing circuit 12*a* generates the sample data TD2 according to the exchange information SC2 and the facial image FA2 and the sample data TD2 is such as a combination of the exchange information SC2 and the facial image FA2. Or, the processing circuit 12*a* generates the sample data TD2 according to the exchange information SC2 and the facial feature FE2 and the sample data TD2 is such as a combination of the exchange information SC2 and the facial feature FE2. Or, the processing circuit 12*a* generates the sample data TD2 according to the exchange information SC2, the facial image FA2 and the facial feature FE2 and the sample data TD2 is such as a combination of the exchange information SC2, the facial image FA2 and the facial feature FE2.

Figure 4:
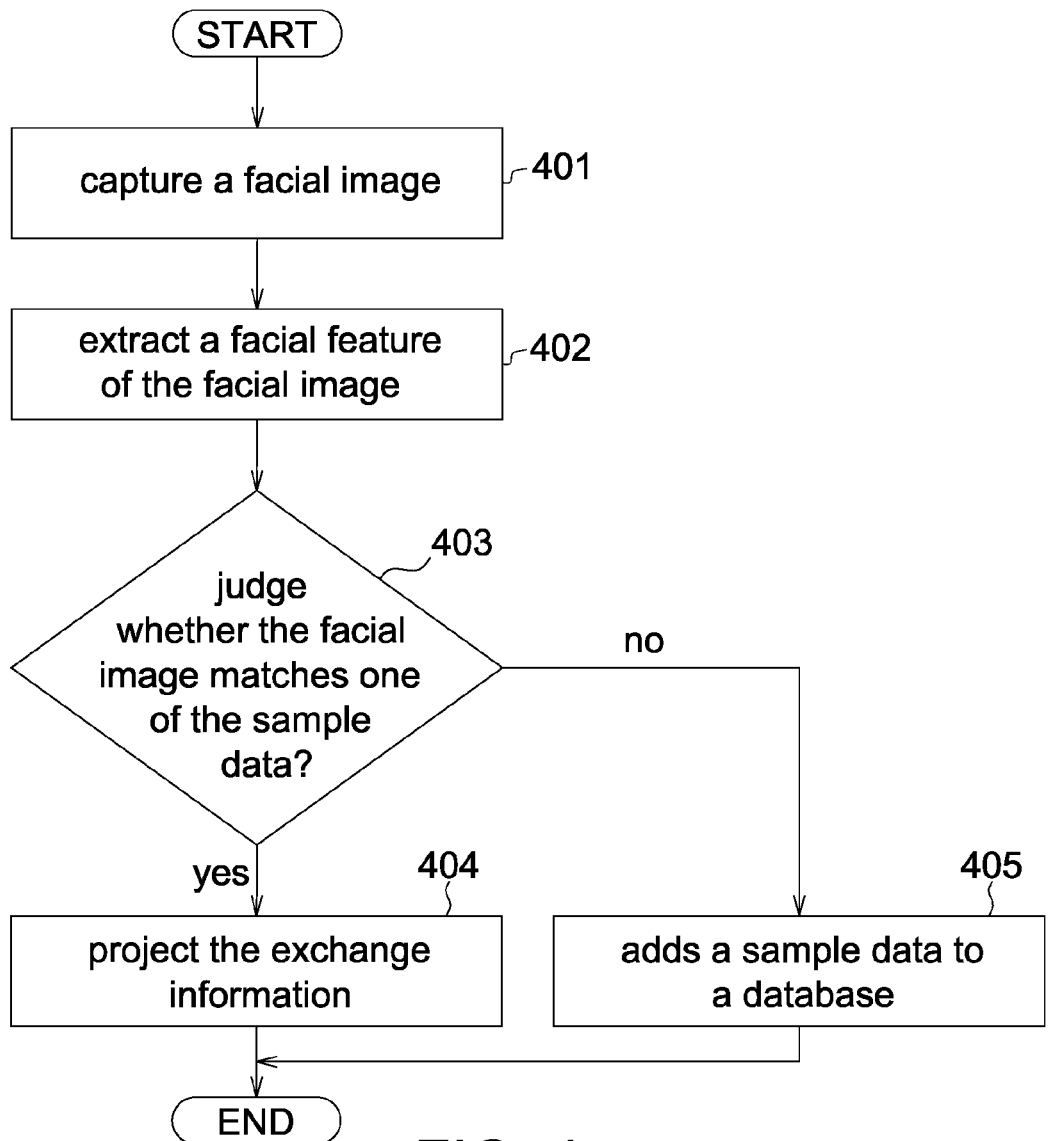
FIG. 4 is a flowchart of displaying an exchange information according to the facial image.

Refer to FIG. 1 and FIG. 4. FIG. 4 is a flowchart of displaying an exchange information according to the facial image. Firstly, the method begins at step 401, the image capturing device 14 captures a facial image FA3. Next, the method proceeds to step 402, the processing circuit 12*a* extracts a facial feature FE3 of the facial image FA3. Then, the method proceeds to step 403, the processing circuit 12*a* judges whether the facial image FA3 matches one of the sample data TD1~TDN stored in the database 12. Furthermore, the processing circuit 12*a* calculates an Euclidean distance according to the facial features of the sample data TD1~TDN and the facial feature FE3 of the facial image FA3. When the Euclidean distance between the facial feature FE2 and the facial feature FE3 is the smallest and the Euclidean distance is smaller than a threshold, this implies that the facial image FA3 matches the sample data TD2.

When the facial image FA3 matches the sample data TD2, the method proceeds to step 404, the processing circuit 12*a* controls the projection unit 16 to project the exchange information SC2. Conversely, when the facial image FA3 does not match the sample data TD2, the method proceeds to step 405, the processing circuit 12*a* adds a sample data TDM to the database 18. The sample data TDM can have different implementations. For example, the processing circuit 12*a* generates the sample data TDM according to the facial feature FE3 and the user's annotations and the user can edit the annotations according to the facial image FA3. The sample data TDM is such as a combination of the facial image FA3 and the facial feature FE3. Or, the processing circuit 12*a* generates the sample data TDM according to the facial image FA3, the facial feature FE3 and the user's annotations. The sample data TDM is such as a combination of the facial image FA3, the facial feature FE3 and the user's annotations.

Second Embodiment

Figure 5:
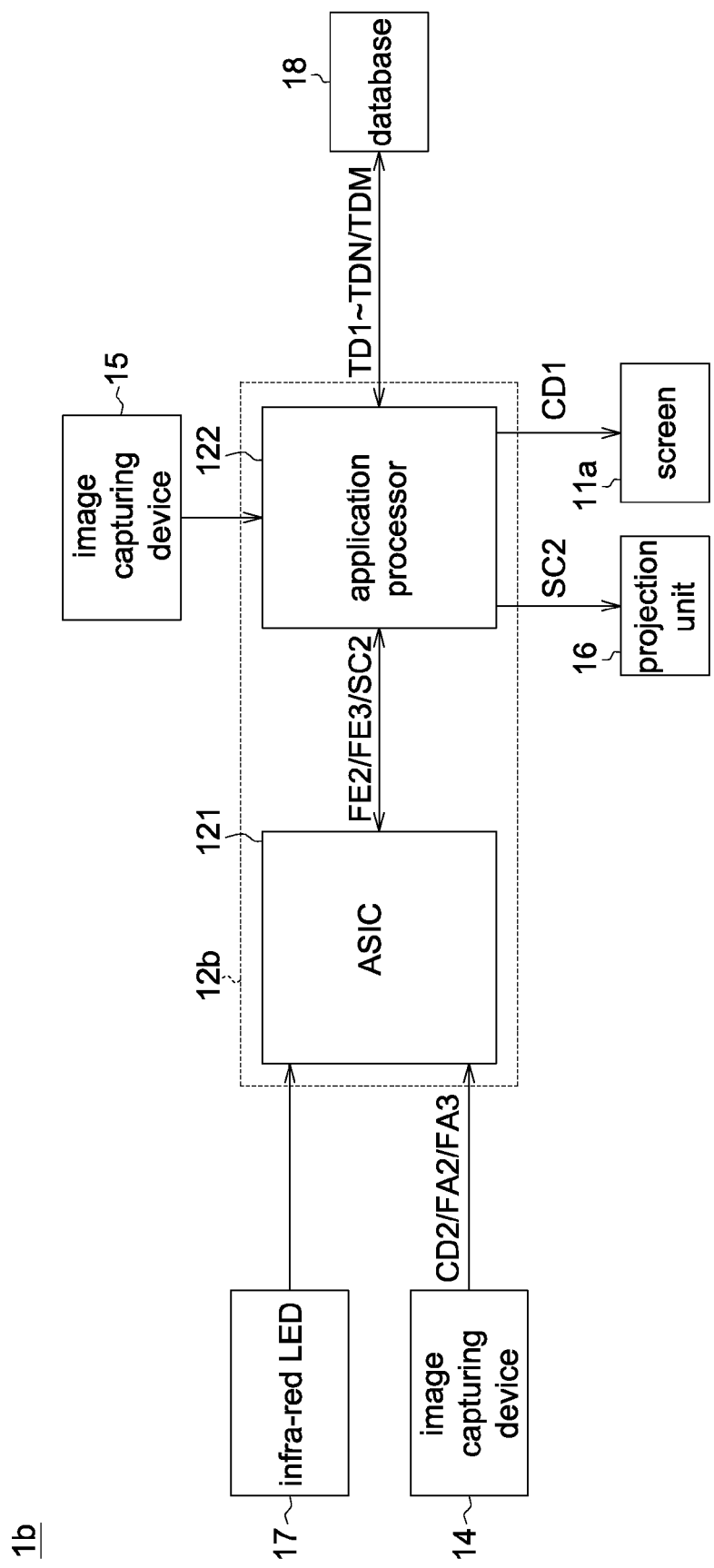
FIG. 5 is a configuration diagram of a head-mounted display according to a second embodiment.

Refer to FIG. 1 and FIG. 5. FIG. 5 is a configuration diagram of a head-mounted display according to a second embodiment. The HMD 1*b* is different from the HMD 1*a* mainly in that the screen 11*a* of the HMD 1*b* is connected to the application processor 122 rather than the ASIC 121 of the processing circuit 12*b*.

Third Embodiment

Figure 6:
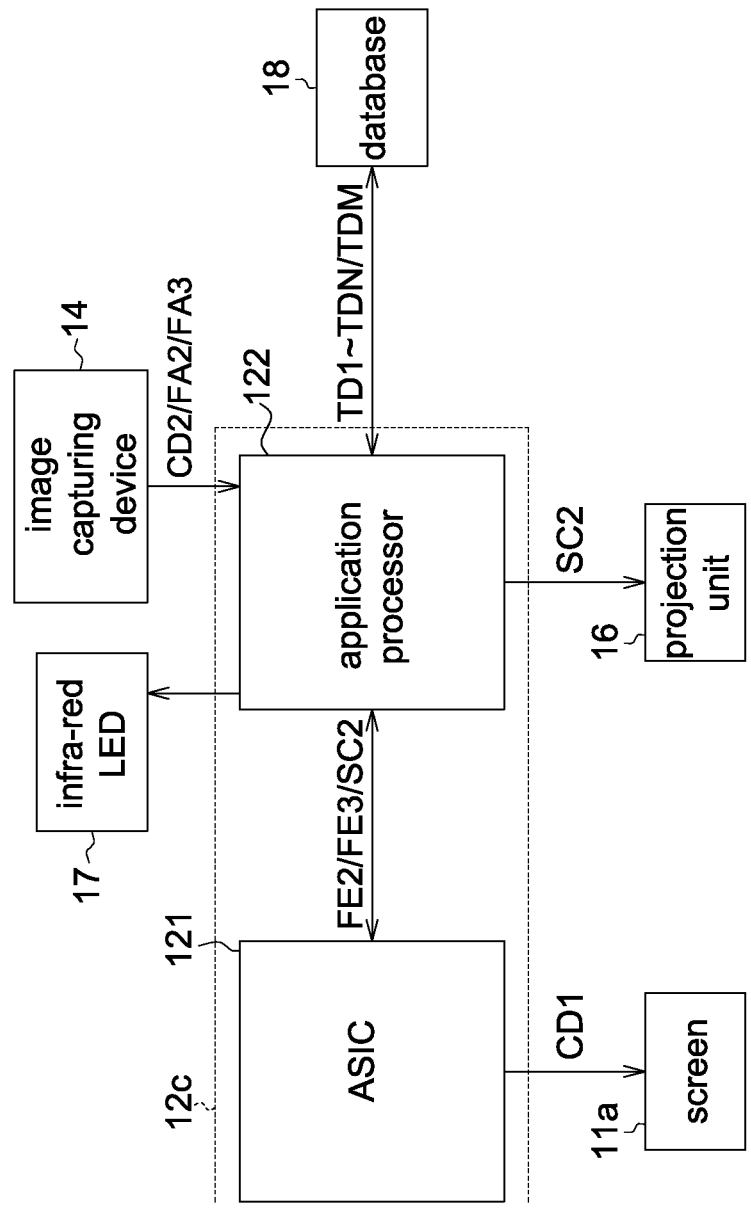
FIG. 6 is a configuration diagram of a head-mounted display according to a third embodiment.

Refer to FIG. 1 and FIG. 6. FIG. 6 is a configuration diagram of a head-mounted display according to a third embodiment. The HMD 1*c* is different from the HMD 1*a* mainly in that the infra-red LED 17 and the image capturing device 14 of the HMD 1*c* are connected to the application processor 122 rather than the ASIC 121 of the processing circuit 12*c*.

Fourth Embodiment

Figure 7:
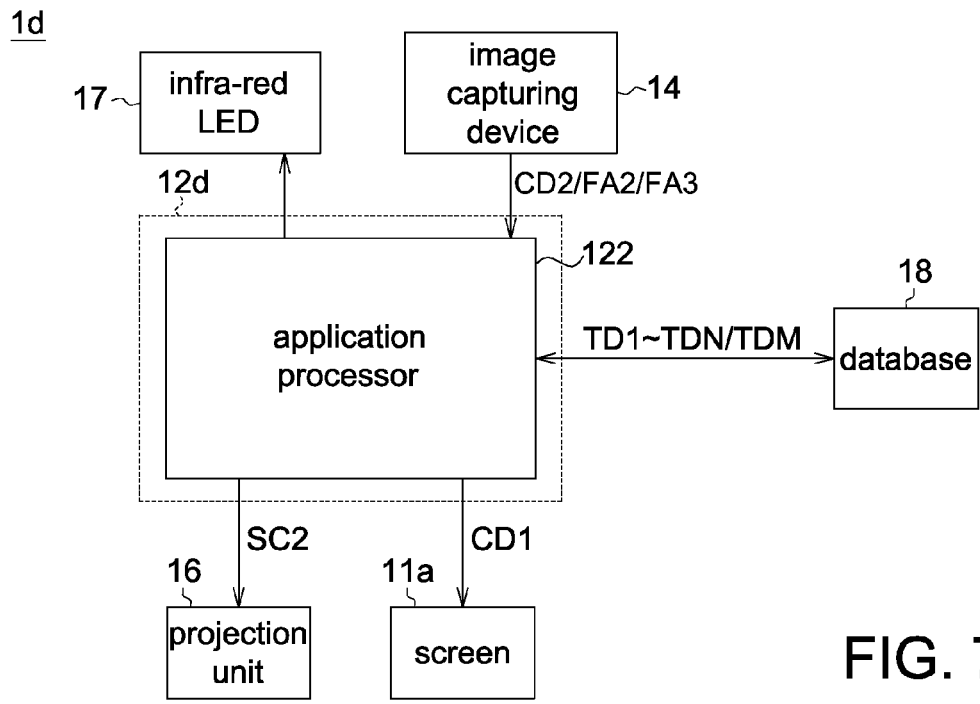
FIG. 7 is a configuration diagram of a head-mounted display according to a fourth embodiment.

Refer to FIG. 1 and FIG. 7. FIG. 7 is a configuration diagram of a head-mounted display according to a fourth embodiment. The HMD 1*d* is different from the HMD 1*a* mainly in that the processing circuit 12*d* of the HMD 1*d* does not comprise an ASIC 121. The screen 11*a*, the infra-red LED 17 and the image capturing device 14 of the HMD 1*d* are connected to the application processor 122.

Fifth Embodiment

Figure 8:
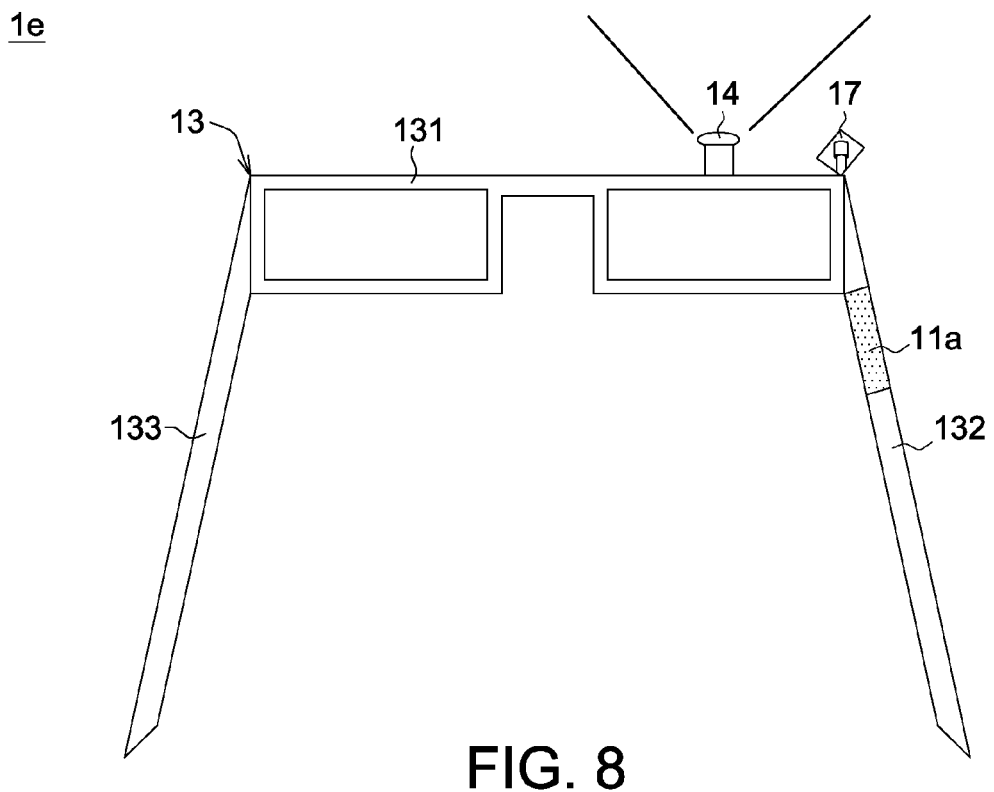
FIG. 8 is an appearance diagram of a head-mounted display according to a fifth embodiment.

Refer to FIG. 2 and FIG. 8. FIG. 8 is an appearance diagram of a head-mounted display according to a fifth embodiment. The HMD 1*e* is different from the HMD 1*a* mainly in that the screen 11*a* of the HMD 1*e* is disposed on the handle 132 rather than the frame 131.

Sixth Embodiment

Figure 9:
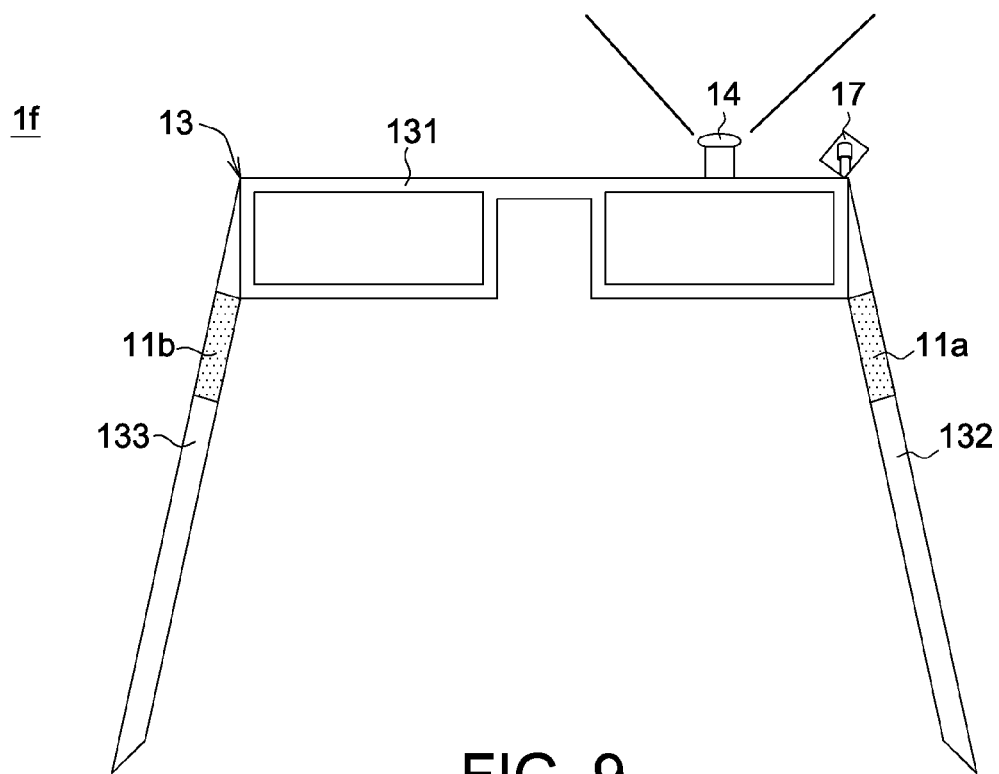
FIG. 9 is an appearance diagram of a head-mounted display according to a sixth embodiment.

Refer to FIG. 8 and FIG. 9. FIG. 9 is an appearance diagram of a head-mounted display according to a sixth embodiment. The HMD 1*f* is different from the HMD 1*e* mainly in that the HMD 1*f* further comprises a screen 11*b* disposed on the handle 132. The screen 11*a* and the screen 11*b* can display the same or different coded data. When the screen 11*a* and the screen 11*b* display different coded data, the coded data displayed on the screen 11*a* and the screen 11*b* are associated with the user's exchange information. That is, when the exchange information that the user wants to share cannot be compressed as one coded data, the exchange information can be compressed as two coded data: one is displayed on the screen 11*a* and the other one is displayed on the screen 11*b*.

Seventh Embodiment

Figure 10:
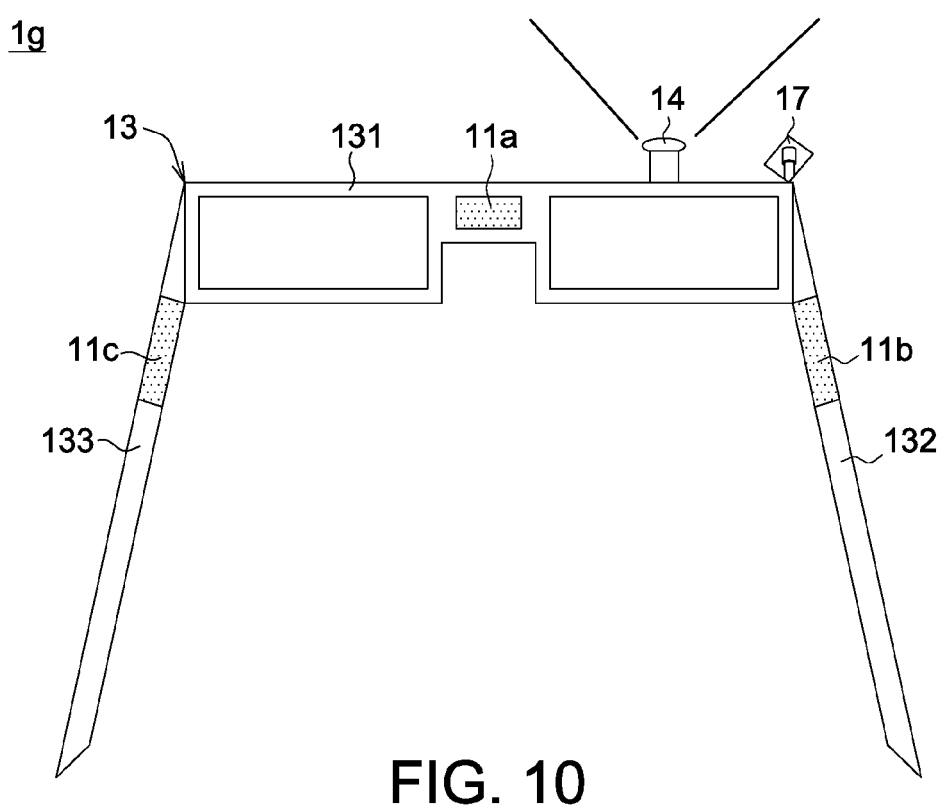
FIG. 10 is an appearance diagram of a head-mounted display according to a seventh embodiment.

Refer to FIG. 2 and FIG. 10. FIG. 10 is an appearance diagram of a head-mounted display according to a seventh embodiment. The HMD 1*g* is different from the HMD 1*a* mainly in that the HMD 1*g* further comprises a screen 11*b* and a screen 11*c*. The screen 11*b* is disposed on the handle 132 and the screen 11*c* is disposed on the handle 133. Similarly, the screen 11*a*, the screen 11*b* and the screen 11*c* can display the same or different coded data. When the screen 11*a*, the screen 11*b* and the screen 11*c* display different coded data, the coded data displayed on the screen 11*a*, the screen 11*b* and the screen 11*c* are associated with the user's exchange information. That is, when the exchange information that the user wants to share cannot be compressed as one coded data, the exchange information can be compressed as three coded data: one is displayed on the screen 11*a*, another one is displayed on the screen 11*b* and the remaining one is displayed on the screen 11*c*.

While the invention has been described by way of example and in terms of the preferred embodiment (s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A head-mounted display (HMD), comprising:
   a first screen for displaying first coded data associated with first exchange information;
   a processing circuit for outputting the first coded data to the first screen; and
   an eyeglass frame for carrying the first screen and the processing circuit;
   wherein the eyeglass frame comprises a frame, a first handle and a second handle, the frame is located between the first handle and the second handle and the first screen is disposed on the first handle.

2. The head-mounted display according to claim 1, further comprising:
   a database for storing at least a sample data;
   an image capturing device for capturing second coded data, wherein the processing circuit generates second exchange information according to the second coded data and generates the sample data according to the second exchange information; and
   a projection unit for projecting the second exchange information.

3. The head-mounted display according to claim 2, wherein the image capturing device captures a first facial image associated with the second coded data.

4. The head-mounted display according to claim 3, wherein the processing circuit extracts a plurality of first facial features of the first facial image.

5. The head-mounted display according to claim 4, wherein the processing circuit generates the sample data according to the second exchange information and the first facial features.

6. The head-mounted display according to claim 4, wherein the processing circuit generates the sample data according to the second exchange information, the first facial image and the first facial features.

7. The head-mounted display according to claim 4, wherein the image capturing device captures a second facial image, the processing circuit extracts a plurality of second facial features of the second facial image and judges whether the second facial image matches the sample data and when the second facial image matches the sample data, the processing circuit controls the projection unit to project the second exchange information.

8. The head-mounted display according to claim 7, wherein when the second facial image does not match the sample data, the processing circuit adds another sample data to the database, the processing circuit generates the another sample data according to the second facial features and a user's annotations.

9. The head-mounted display according to claim 7, wherein the processing circuit calculates an a Euclidean distance according to the first facial features and the second facial features, when the Euclidean distance is the smallest and the Euclidean distance is smaller than a threshold, the second facial image matches the sample data.

10. The head-mounted display according to claim 3, wherein the processing circuit generates the sample data according to the second exchange information and the first facial image.

11. The head-mounted display according to claim 2, wherein the processing circuit comprises an application specific integrated circuit (ASIC) and an application processor, the ASIC is connected to the application processor, the image capturing device and the first screen are connected to the ASIC and the projection unit is connected to the application processor.

12. The head-mounted display according to claim 2, wherein the processing circuit comprises an application specific integrated circuit (ASIC) and an application processor, the ASIC is connected to the application processor, the image capturing device is connected to the ASIC and the projection unit and the first screen are connected to the application processor.

13. The head-mounted display according to claim 2, wherein the processing circuit comprises an application specific integrated circuit (ASIC) and an application processor, the ASIC is connected to the application processor, the first screen is connected to the ASIC and the projection unit and the image capturing device are connected to the application processor.

14. The head-mounted display according to claim 2, wherein the processing circuit comprises an application processor, the first screen, the projection unit and the image capturing device are connected to the application processor.

15. The head-mounted display according to claim 1, further comprising:
   a second screen for displaying a second coded data associated with the first exchange information.

16. The head-mounted display according to claim 15, wherein the second screen is disposed on the second handle.

17. The head-mounted display according to claim 15, further comprising:
   a third screen for displaying third coded data associated with the first exchange information.

18. The head-mounted display according to claim 17, wherein the third screen is disposed on the second handle.

19. The head-mounted display according to claim 1, wherein the first coded data is a two-dimensional matrix barcode.

20. The head-mounted display according to claim 19, wherein the two-dimensional matrix barcode is a QR code, a micro QR code, a data matrix or an Aztec code.

* * * * *